Feb. 21, 1956   C. E. VOGELEY, JR., ET AL   2,736,019
PHASE-COMPARATOR TRACKING-SYSTEM
Filed Nov. 2, 1948
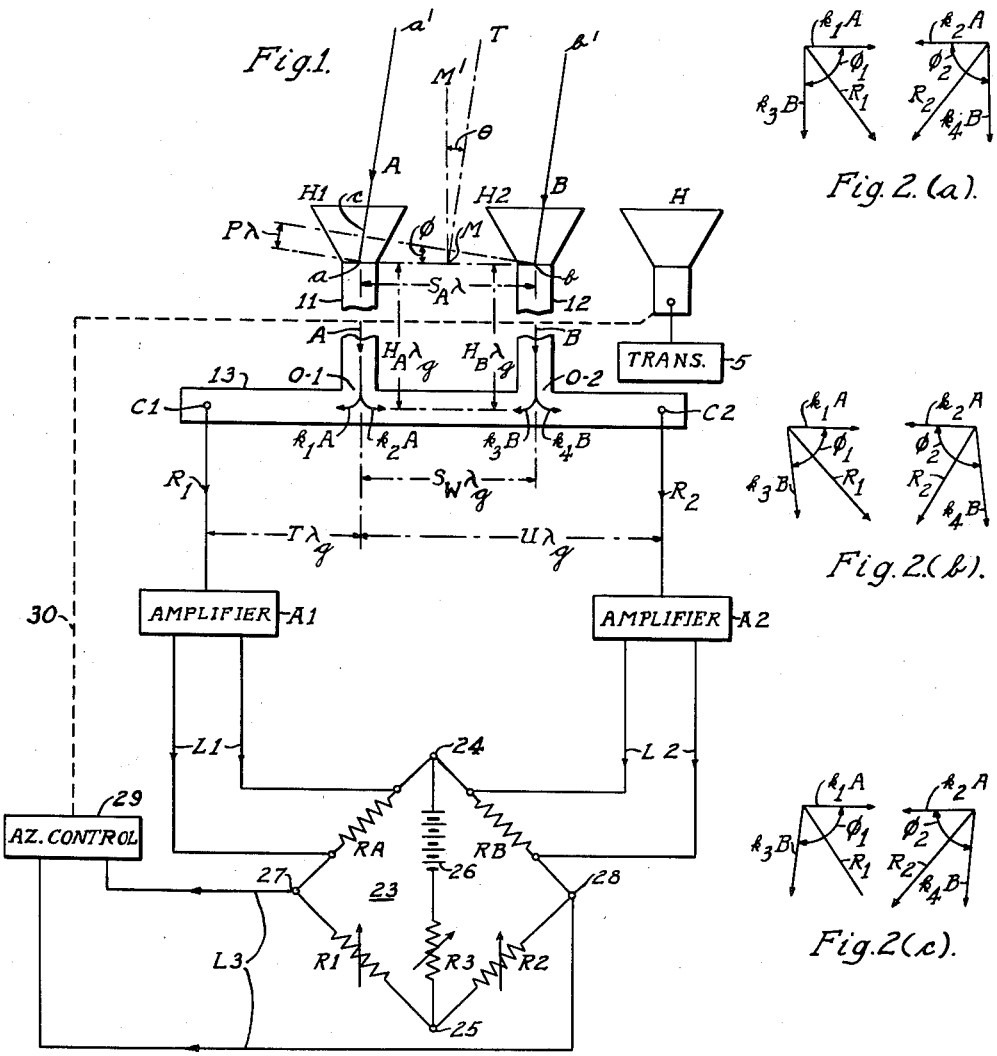
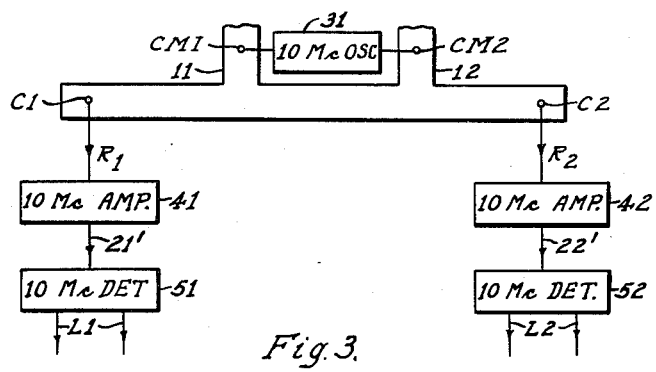
INVENTORS
Clyde E. Vogeley, Jr. and
Theodore Miller.
BY O. B. Buchanan
ATTORNEY

United States Patent Office 2,736,019
Patented Feb. 21, 1956

2,736,019
PHASE-COMPARATOR TRACKING-SYSTEM

Clyde E. Vogeley, Jr., and Theadore Miller, Pittsburgh, Pa., assignors, by mesne assignments, to the United States of America as represented by the Secretary of the Navy Application November 2, 1948, Serial No. 57,986

11 Claims. (Cl. 343—7.4)

Our invention relates to a novel type of automatic radar tracking-system or the like, and to a novel type of phase-comparator which is particularly adapted for our automatic radar tracking-system, but which is susceptible of other uses, separate from the tracking-system. Our invention is particularly adapted for continuous-wave radar, although it can be used in connection with any kind of transmitter-system or systems which send out either high-frequency radio-waves, or radar-waves (or micro-waves), or lower-frequency waves (such as supersonic or sonic waves), which are reflected back to our target-tracking echo-wave device; or our target-tracking device may be used to track a target which is transmitting radiation or wave-energy of a given frequency, as distinguished from merely reflecting a radiation or wave-energy with which it is "illuminated."

An object of our invention is to provide a target-tracking wave-device comprising a directional receiving-antenna system which includes two spaced, substantially parallel-aimed antenna-means, for receiving two waves of the same frequency from the target, in combination with a suitable phase-comparator which will very sensitively show which of the two incoming waves is lagging, in phase, behind the other.

A further object of our invention is to provide a novel type of phase-comparator means, which is particularly adapted for use in our target-tracking means, but which is susceptible of other phase-comparator uses.

More specifically, it is an object of our invention to provide a phase-comparator for responding to the relative phase-angle between two input-waves, comprising means for providing two resultant-waves, which are provided by vectorially combining the two input-waves, after having introduced a certain leading-angle, in one of the input-waves, in order to obtain the first resultant-wave, and after having introduced a certain lagging angle, in the same input-wave, in order to obtain the second resultant-wave, in combination with means for comparing the relative magnitudes of the two resultant-waves.

With the foregoing and other objects in view, our invention consists in the systems, circuits, parts, and methods of design and use, hereinafter described and claimed, and illustrated in the accompanying drawing, wherein:

Fig. 1 is a block-diagram illustrating, with considerable simplification, the essential component-parts and connections of an illustrative form of embodiment of our invention;

Figs. 2a, 2b, and 2c are vector-diagrams which will be referred to in the explanation of the invention, and Fig. 3 is a fragmentary view illustrating a modification of a part of Fig. 1.

In Fig. 1, we have illustrated a simple form of our invention which is used only in azimuth-tracking of a target. This illustrates the general principles of the target-tracking phase of our invention, because when elevation-tracking is necessary, the elevation-tracking apparatus is merely a repetition of the azimuth-tracking apparatus, turned at right angles.

In the illustrative form of embodiment of our invention, as shown in Fig. 1, a radiant-energy transmitter-system is diagrammatically indicated, as comprising a transmitter 5, operating at $x$ megacycles (mc.). This transmitter is preferably a continuous-wave transmitter, although our invention is not limited to this particular type of transmitter.

This transmitter 5 is used as a part of a target-tracking echo-wave device, which includes a directional antenna-system for aiming a transmitted wave from said transmitter to a target (not shown) and for receiving an echo-wave from the target. This directional antenna-system may take any one of a number of forms, which are well known in the art; and it may comprise either one antenna or a plurality of separate, mechanically connected antennas. By way of illustration of a representative type of antenna-system, without in any way desiring to limit ourselves to this particular type of antenna-system, we have shown a directional antenna-system comprising three horns, a horn H for transmitting the wave from the transmitter 5, and two horns H1 and H2 for receiving two echo-waves A and B from the target, these receiver-horns H1 and H2 being spaced by a distance $ab$, and being directed in lines parallel to each other, and hence, in parallel to the antenna-aiming direction MM', which may be regarded as a line drawn half-way between the two receiving-horns H1 and H2.

The two receiver-horns H1 and H2 feed the respective received waves A and B into suitable input-circuit wave-conducting means, such as waveguides 11 and 12, which feed the respective input-waves A and B into two spaced orifices O–1 and O–2 in a main waveguide 13. The main waveguide 13 is intended to be representative of any transmission-line means for transmitting electromagnetic wave-energy, and the orifices O–1 and O–2 are intended to be representative of any tapped points, of such nature that, at each tapped point, the input-wave is split into two parts which travel in opposite directions along the main waveguide or transmission-line 13. Thus, the input-wave A is divided into two waves, $k_1A$ and $k_2A$, traveling respectively to the left and to the right, along the main waveguide 13, from the orifice O–1. In like manner, the input-wave B is split into two parts, $k_3B$ and $k_4B$, traveling respectively to the left and to the right along the main waveguide 13, as indicated in Fig. 1. Within certain limits, the several coefficients $k_1$ to $k_4$ may have any relative values, according to the design of the main transmission line 13.

In the main waveguide 13, the two orifices O–1 and O–2 are at spaced immediate points between two crystals $C_1$ and $C_2$, or other detector-means for responding to the resultants $R_1$ and $R_2$ of the waves, which appear at these crystals. Thus, at the left-hand crystal $C_1$, the two waves $k_1A$ and $k_3B$ combined vectorially to produce the resultant-wave $R_1$; whereas, at the right-hand crystal $C_2$, the two waves $k_2A$ and $k_4B$ combine vectorially to produce the resultant-wave $R_2$.

Any suitable means are provided, for suitably responding to, and rectifying, the two resultant-waves $R_1$ and $R_2$, and for comparing the relative magnitudes of the rectified waves, so as to determine whether the ratio of the magnitudes of the resultant-waves, $R_1/R_2$ is increasing or decreasing above or below a predetermined norm. An illustration apparatus is indicated by block-diagram in Fig. 1, in which the incoming signals are rectified at the crystals C1 and C2, fed at R1 and R2 to direct-current amplifiers A1 and A2, respectively, and then are fed, through the amplifier output-leads L1 and L2, to the terminals of two bridge-resistors RA and RB, respectively.

The two resistors RA and RB constitute two of the arms of a bridge 23, which is composed of these two resistors RA and RB, and to two other resistors R1 and R2, the latter two resistors being indicated as being variable. One of the bridge-diagonals, such as the diagonal between the bridge-points 24 and 25, is supplied with a unidirectional-current voltage from a suitable source such as battery 26 in series with a variable resistor R3. The other bridge-diagonal, comprising the bridge-points 27 and 28, is connected to a control-circuit L3 which is used to control an automatic azimuth-control apparatus 29, which is mechanically connected to the antenna-system H1 and H2, as diagrammatically indicated by dotted lines at 30.

In the operation of the target-tracking part of our invention, the first essential is that, if the directed antenna-system is exactly on line with the target, the two received waves A and B reach the horn-centers $a$ and $b$ exactly in phase with each other, whereas, if the directed antenna-system is off-center with respect to the target, as shown in Fig. 1, the two received waves A and B reach the horn-centers $a$ and $b$ considerably out of phase with each other, so that this circumstance can be responded to by suitable phase-comparator means.

In Fig. 1, let us assume that the spacing between the received-wave horn-centers $a$ and $b$ of the antenna-system is $ab = S_A \lambda$, where $\lambda$ is the wavelength of the reflected wave which comes in through the air (or other medium) from the target (not shown).

Let us assume that the target is displaced from the antenna-pointing direction MM′, (which is normal to $ab$), by a target-angle $\theta$, counting this target-angle $\theta$ as being positive if the target is to be right of the antenna-pointing direction MM′, as shown in Fig. 1, and counting this target-angle $\theta$ as being negative if the target is to the left of the antenna-pointing direction.

The distance to the target (not shown) will be very large as compared to the antenna-spacing $ab = S_A \lambda$, and hence we may consider that the two received waves A and B come in, to the horns H1 and H2, respectively, on parallel lines $a'a$ and $b'b$, respectively.

If we drop a perpendicular $bc$ onto the line $a'a$, it will be obvious that the two waves A and B, on arriving at the points $c$ and $b$, respectively, will have traveled equal distances from the target, and hence will be in phase with each other at these points.

Before reaching its receiver-horn, the first received wave, A, will have to travel further than the second received wave, B, by the length of the line $ca$, which we may express, in terms of the wavelength $\lambda$, as being $ca = P\lambda$.

From the triangle $acb$ it is evident that $$P = S_A \sin \theta \qquad (1)$$

at all values of the target-angle $\theta$ and $$P = 0.01745 \, S_A \theta^0 \qquad (2)$$

when $\theta$ is in degrees and is small.

The wave A, of wavelength $\lambda$, in traveling a distance $ca = P\lambda$, will become more lagging in phase by a phase-angle $$\theta^0 = 360 \, P = 6.28 \, S_A \theta^0 = 2\pi S_A \theta^0 \qquad (3)$$

when $\theta$ is small, and $$\theta = 360 \, P = 360 \, S_A \sin \theta \qquad (4)$$

when $\theta$ is large.

It will be seen, from Equation 3, that if the target becomes displaced from the antenna-pointing direction by only as mall angle $\theta$, we will obtain a large phase-angle difference, $\phi$, between the two incoming waves A and B, at the horn-centers $a$ and $b$, respectively, said phase-difference $\phi$ being $2\pi S_A$ times the target-displacement-angle $\theta$ in the plane of the paper in Fig. 1, where $S_A$ is the number of wavelengths $\lambda$ in the antenna-spacing $ab = S_A \lambda$. It is obvious that the multiplication of the sensitivity of response to the target-angle $\theta$ is increased, the larger we can make the antenna-spacing $ab = S_A \lambda$. However, the more we increase $S_A$, the narrower will be the range of target-angles $\theta$ over which our apparatus will be able to hold onto the target, or properly respond to its angle $\theta$. A practical limit of proper responsiveness is reached when the double phase-displacement angle, $2\phi^0$ (responding to the two sides of the antenna-pointing direction), becomes 180°; or, if symmetry of response is obtained whether the target-angle $\theta$ is positive or negative, a practical limit is reached when P becomes as large as ¼ in Equation 4. Putting P<¼ in Equation 1, we see that the range of target-angle $\theta$ to which our apparatus is properly responsive, without requiring correction, is given by the inequality, $$\sin \theta < \frac{1}{4S_A} \qquad (5)$$

After the incoming waves A and B reach the horn-centers $a$ and $b$, the waves travel through waveguides, and we are interested in the guide-wavelength $\lambda_g$. If the waves A and B traverse guide-lengths $H_A \lambda_g$ and $H_B \lambda_g$, respectively, in reaching the orifices O–1 and O–2, respectively, and if these orifices O–1 and O–2 are spaced by $S_W \lambda_g$, and if the orifice O–1 is spaced from the crystals C1 and C2 by $T\lambda_g$ and $U\lambda_g$, respectively, we can calculate the phase-differences $\phi_1$ and $\phi_2$ which are obtained between the two waves which reach each of the respective crystals C1 and C2, as follows.

At the left-hand crystal C1, the wave $k_3 B$ will have traveled further than, (and hence will lag behind), the wave $k_1 A$, by the distance $$(H_B + S_W + T)\lambda_g - [P\lambda + (H_A + T)\lambda_g] = [S_W - (H_A - H_B)]\lambda_g - P\lambda \qquad (6)$$

At the right-hand crystal C2, the wave $k_2 A$ will have traveled further than, (and hence will lag behind), the wave $k_4 B$, by the distance, $$[P\lambda + (H_A + U)\lambda_g] - (H_B + U - S_W)\lambda_g = [S_W + (H_A - H_B)]\lambda_g + P\lambda \qquad (7)$$

At the respective crystals C1 and C2, the phase-difference-angles, $G_1^0$ and $G_2^0$, due to the traversal of the waveguide by the waves, are equal to 360 times the fractional or decimal parts of the numbers $$(S_W - H_A + H_B)$$

and $(S_W + H_A - H_B)$, respectively.

At both of the crystals C1 and C2, we obtain the same phase-difference-angle, $\phi^0 = 2\pi S_A \phi^0$, due to the traversal of the distance $ca = P\lambda$ in air, as expressed in Equation 3, this phase-angle $\phi^0$ being subtracted from $G_1^0$ at the crystal C1, and being added to $G_2^0$ at the crystal C2, as shown in Equations 6 and 7.

The phase-difference between the two incident waves $k_3 B$ and $k_1 A$ at the left-hand crystal C1 is therefore $$\phi_1 = G_1^0 - \phi^0 = G_1^0 - 2\pi S_A \theta^0 \qquad (8)$$

The phase-difference between the two incident waves $K_2 A$ and $k_4 B$ at the right-hand crystal C2 is $$\phi_2 = G_2^0 + \phi^0 = G_2^0 + 2\pi S_A \theta^0 \qquad (9)$$

The magnitude of the total or resultant-wave $R_1$ at the left-hand crystal C1 is shown by the equation, $$R_1^2 = k_1^2 A_1^2 + k_3^2 B^2 + 2k_1 k_3 AB \cos \phi_1 = k_1^2 A^2 + k_3^2 B^2 + k_1 k_3 AB (\cos G_1^0 \cos \phi^0 + \sin G_1^0 \sin \phi^0) \qquad (10)$$

The magnitude of the total or resultant-wave $R_2$ at the right-hand crystal C2 is shown by the equation, $$R_2{}^2 = k_2{}^2 A^2 + k_4{}^2 B^2 + 2k_2 k_4 AB \cos \phi_2 = k_2{}^2 A^2 + k_4{}^2 B^2 + 2k_2 k_4 AB (\cos G_2{}^0 \cos \phi^0 - \sin G_2{}^0 \sin \phi^0) \quad (11)$$

Our invention operates on the principle of comparing the relative magnitudes of the two resultant-waves $R_1$ and $R_2$, and hence it is desirable for the constant or non-directional angle-components $G_1{}^0$ and $G_2{}^0$ to be as close to either plus or minus 90° as possible, at which values the cosines of the resultant angles $\phi_1$ and $\phi_2$ of Equations 8 and 9 will be varying at their maximum rate in response to variations in said resultant-angles $\phi_1$ and $\phi_2$. In this way, the variable or target-directional angle-components $$\mp \phi^0 = \mp 2\pi S_A \theta^0$$

which are dependent upon the off-center angle $\theta^0$ of the target, will produce a maximum change in the values of the respective resultant waves $R_1$ and $R_2$. At any rate, the waveguide-produced constant angles $G_1{}^0$ and $G_2{}^0$ must not be equal to either zero or 180°, because then the resultant-waves $R_1$ and $R_2$ would be equal in magnitude, whatever might be the value of the off-center target-angle $\theta$.

It is convenient to design the waveguide so that the horn-to-orifice distances $H_A \lambda_g$ and $H_B \lambda_g$ are either equal or different from each other by a whole number of guide-wavelengths $\lambda_g$, so that the constant guide-produced angle-components $G_1{}^0$ and $G_2{}^0$ will be equal to 360 times the decimal or fractional part of the coefficient $S_w$ which defines the orifice-spacing $S_w \lambda_g$ in the waveguide. Hence $S_w \lambda_g$ must be equal to an odd number of quarter-wavelengths $\lambda_g/4$ of the waves in the waveguide, for optimum conditions (thus giving an angle equal to 90° or 270°), and can not under any circumstances be equal to an even number of quarter-wavelengths $\lambda_g/4$ (which would give an angle of zero or 180°).

If the guide-produced angle-components $G_1{}^0$ and $G_2{}^0$ are equal to +90°, for example, Equation 10 and 11 become $$R_1{}^2 = k_1{}^2 A^2 + k_3{}^2 B^2 + 2k_1 k_3 AB \sin \theta^0 \quad (10')$$

and $$R_2{}^2 = k_2{}^2 A^2 + k_4{}^2 B^2 - 2k_2 k_4 AB \sin \theta^0 \quad (11')$$

where the directionally responsive angle-component, $\pm \phi^0$, is as defined in Equations 3 and 4, being rapidly variable in response to small changes in the target-direction $\theta$ with respect to the centerline MM' of the antenna.

Figs. 2a, 2b and 2c show the vector-diagrams for the two resultant-waves $R_1$ and $R_2$, according to Equations 10' and 11', under conditions when (a) the target is on-center, or $\theta$ is zero; (b) the target is to the right of the antenna-pointing direction MM', as shown in Fig. 1, or $\theta$ is positive; and (c) the target is off-center to the left, or $\theta$ is negative. It will be noted that the ratio $R_1/R_2$ of the magnitudes of the two resultant-waves $R_1$ and $R_2$ becomes larger when the target-angle $\theta$ is positive (or to the right), and becomes smaller when the target-angle $\theta$ is negative (or to the left).

The bridge 23 is brought into balance, as by adjustment of one or both of the variable resistors $R_1$ and $R_2$, at any desired value of the ratio $R_1/R_2$ of the two resultant-waves $R_1$ and $R_2$, as, (for example), under the conditions when the directional antenna-system is exactly on-target. Under these conditions, since the bridge is balanced, the output-voltage of the bridge is zero, in the output-circuit L3 of the bridge. Then, if the target moves very slightly to the right, as viewed in Fig. 1, so that the target-angle $\theta$ is positive, the first resultant-wave $R_1$ becomes larger, as shown in Equation 10 or 10' and in Fig. 2b, while the second resultant-wave $R_2$ becomes smaller, as shown by Equation 11 or 11', and as also shown in Fig. 2b, as will be seen in comparing Fig. 2b with Fig. 2a. On the other hand, if the target should move off-center to the left, so that the angle $\theta$ becomes negative, it will be the second input-wave B which lags behind the first input-wave A, as it reaches the antenna-system, so that the first resultant-wave $R_1$ becomes smaller, and the second resultant-wave $R_2$ becomes larger, as shown in Fig. 2c, as also will be seen from the equations, if a minus value is assigned to the phase-angle $\theta^0$.

The bridge 23 will be thrown off-balance by these changes in the relative magnitudes of the resultant-waves $R_1$ and $R_2$, so that the bridge produces an output-voltage which varies in sign and magnitude in accordance with the relative magnitudes of the two resultant-waves $R_1$ and $R_2$, thereby producing a variable unidirectional voltage of one polarity or the other, which can be used for automatic-tracking purposes, that is, to re-aim the antenna-system so that it keeps exactly on-target, as diagrammatically indicated in Fig. 1.

It will be understood that the bridge 23 is merely an exemplification of suitable apparatus for responding to changes in the ratio $R_1/R_2$ of the amplitudes or magnitudes of the two resultant-waves $R_1$ and $R_2$.

It will also be observed that our system is self-balancing, so that the correcting signals which are obtained in the output-circuit L3 of the bridge are independent of the range of the target or the echo-area of the target.

Furthermore, while we have described our system more particularly with respect to azimuth-control, it will be obvious that a duplicate of the same system, turned at right angles, could also be used to obtain corrections in elevation. This would imply an arrangement of a directional receiver-antenna system which is operative in elevation as well as in azimuth. If the receiver-antenna system is in the form of horns (to carry out our original illustration), this would imply four horns, these horns including the two previously described azimuth-finding horns H1 and H2, and two (other elevation-finding horns (not shown).

In regard to the phase-comparator part of our invention, it will be observed that while we have illustrated our phase-comparator as being composed of waveguides, it is generally applicable to any wave-conducting means or transmission-line in which the conducted or transmitted wave suffers a phase-shift as it travels along the phase-conductor or guide or line.

An essential distinctive novel feature of our new method and means of phase-comparison is discernible from Equations 6 and 7, remembering that a waveguide-distance which is expressed in terms of a coefficient times the guide-wavelength $\lambda_g$ represents a phase-angle lag which is equal to 360 times the decimal or fractional part of said coefficient. In Equations 6 and 7 the coefficient P represents the phase-shift of $\phi^0$ in the first received wave A, which is dependent upon the target-angle $\theta$, as shown in Equation 3.

Referring to the parts of Equations 6 and 7 which relate to the phase-shifts which are introduced in the waveguide phase-comparator, that is, referring to the decimal parts of the coefficients of the guide-wavelength $\lambda_g$, it will be noted that the left-hand derived-wave $k_3 B$ of the second input-wave B is in effect lagged in phase by a fixed component, as represented by the decimal part of the coefficient $S_w$, more than the amount by which the left-hand derived wave $k_1 A$ of the first input-wave A is lagged in the waveguide phase-comparator; whereas, in the case of the two right-hand derived waves $k_4 B$ and $k_2 A$, the coefficient $S_w$ has a negative sign, indicating that this is a leading phase-shift, rather than a lagging phase-shift. In other words, an essential fundamental feature of our new phase-comparator is that each of the two input-waves A and B shall be used to obtain two derived waves, shown as flowing to the right and left respectively, and the two left-hand derived waves are vectorially combined to produce a first resultant-wave $R_1$, while the two right-hand derived waves are vectorially combined to produce a second resultant wave R₂, but only after the phase-comparator apparatus has introduced a phase-shift angle which lags more, in the left-hand component of the second input-wave B, than in the left-hand component of the first input wave A, whereas the waveguide phase-comparator as introduced a phase-shift angle which lags less, in the right-hand derived wave of the second input-wave B, than in the right-hand derived wave of the first input-wave A.

These leading and lagging phase-angles which are introduced in the waveguide approximate an optimum value of an odd multiple of 90°, corresponding to an orifice-separation of an odd number of quarter-wavelengths along the guide. These angles, at any rate, can not be equal, or nearly equal, to zero, or any multiple of 180°, corresponding to an orifice-separation of zero or a multiple of a half-wavelength or an even multiple of a quarter-wavelength. The two resultant-waves need only to be compared in magnitude, to obtain a response to the phase-shift angle $\phi^0$ which is responsive to the target-angle $\theta$, as previously pointed out.

As an example of one of the many changes in detail, which may be incorporated in our invention, we have shown, in Fig. 3, a modification of Fig. 1, in which the input-circuit waveguides 11 and 12 are provided with crystal modulators CM1 and CM2, respectively, which amplitude-modulate the two input-waves or signals A and B at 10 megacycles, as supplied from a local oscillator 31. Here, the frequency of 10 megacycles is given only by way of example, as any suitable modulating frequency might have been chosen. In Fig. 3, the amplification of the resultant-waves R₁ and R₂ is made at the modulator-frequency, as indicated by the 10-megacycle amplifiers 41 and 42, which are substituted for the input-wave-frequency amplifiers A1 and A2 in Fig. 1. The outputs of the 10-megacycle amplifiers 41 and 42 are then fed, through circuits 21 and 22, to 10 megacycle-detectors or rectifiers, 51 and 52, respectively, the output-circuits of which are equivalent to the output-circuits L1 and L2 of Fig. 1, which constitute the control-circuits for the bridge. The changes which are introduced in Fig. 3 make the system more sensitive, and enhance the signal-to-noise ratio, as will be readily understood.

While we have particularly described and claimed two exemplary-forms of embodiment of our invention, and while we have explained our present ideas relative to its design and performance, we do not wish to be limited to the precise illustrations and explanations which we have given, as it will be obvious that various changes may be made by the skilled workers of the art, by way of additions or refinements, omissions or simplifications, or the substitution of various equivalents, without departing from the essential features of our invention, in its various aspects. We desire, therefore, that the appended claims shall be accorded the broadest construction consistent with their language.

We claim as our invention:

1. A target-tracking echo-wave device, comprising a transmitter-system, a directional antenna-system for aiming a transmitted wave from said transmitter-system to a target and for receiving an echo-wave from said target, at least the receiving part of said directional antenna-system including two spaced, substantially parallel-aimed antenna-means for in effect receiving two echo-waves A and B from said target, a phase-comparator for responding to the relative phase-angle between the two-input waves A and B, said phase-comparator comprising means for obtaining, from wave-A, two derived A-waves having certain phase-shifts introduced therein, means for obtaining, from wave-B, two derived B-waves having certain phase-shifts introduced therein, the phase-shift introduced in the first derived B-wave being greater than the phase-shift introduced in the first derived A-wave by a certain angle, and the phase-shift introduced in the second derived B-wave being less than the phase-shift introduced in the second derived A-wave by a certain angle, said certain angles approximating an optimum value equal to an odd number of 90°, means for vectorially combining the first derived A-wave and the first derived B-wave to produce a first resultant-wave, means for vectorially combining the second derived A-wave and the second derived B-wave to produce a second resultant-wave, means for comparing the relative magnitudes of the two resultant-waves, and automatic antenna-aiming means for correcting the antenna-aim in one direction or the other, according as the ratio of the magnitudes of the two resultant-waves increases or decreases above or below a value corresponding to on-target conditions.

2. A target-tracking echo-wave device, comprising a transmitter-system, a directional antenna-system for aiming a transmitted wave from said transmitter-system to a target and for receiving an echo-wave from said target, at least the receiving part of said directional antenna-system including two spaced, substantially parallel-aimed antenna-means for in effect receiving two echo-waves A and B from said target, a phase-comparator for responding to the relative phase-angle between the two input-waves A and B, said phase-comparator comprising means for obtaining, from wave-A, two derived A-waves having certain phase-shifts introduced therein, means for obtaining, from wave-B, two derived B-waves having certain phase-shifts introduced therein, the phase-shift introduced in the first derived B-wave being greater than the phase-shift introduced in the first derived A-wave by a certain angle, and the phase-shift introduced in the second derived B-wave being less than the phase-shift introduced in the second derived A-wave by a certain angle, said certain angles being substantially different from zero or any multiple of 180°, means for vectorially combining the first derived A-wave and the first derived B-wave to produce a first resultant-wave, means for vectorially combining the second derived A-wave and the second derived B-wave to produce a second resultant-wave, means for comparing the relative magnitudes of the two resultant waves, and automatic antenna-aiming means for correcting the antenna-aim in one direction or the other, according as the ratio of the magnitudes of the two resultant-waves increases or decreases above or below a value corresponding to on-target condition.

3. A target-tracking wave-device, comprising a directional antenna-system including two spaced, substantially parallel-aimed antenna-means for in effect receiving two waves A and B of the same frequency from said target, a phase-comparator for responding to the relative phase-angle between the two input-waves A and B, said phase-comparator comprising means for obtaining, from wave-A, two derived A-waves having certain phase-shifts introduced therein, means for obtaining, from wave-B, two derived B-waves having certain phase-shifts introduced therein, the phase-shift introduced in the first derived B-wave being greater than the phase-shift introduced in the first derived A-wave by a certain angle, and the phase-shift introduced in the second derived B-wave being less than the phase-shift introduced in the second derived A-wave by a certain angle, said certain angles approximating an optimum value equal to an odd number of 90°, means for vectorially combining the first derived A-wave and the first derived B-wave to produce a first resultant-wave, means for vectorially combining the second derived A-wave and the derived second B-wave to produce a second resultant-wave, means for comparing the relative magnitudes of the two resultant-waves, and automatic antenna-aiming means for correcting the antenna-aim in one direction or the other, according as the ratio of the magnitudes of the two resultant-waves increases or decreases above or below a value corresponding to on-target conditions.

4. A target-tracking wave-device, comprising a directional antenna-system including two spaced, substantially parallel-aimed antenna-means for in effect receiving two waves A and B of the same frequency from said target, a phase-comparator for responding to the relative phase-angle between the two input-waves A and B, said phase-comparator comprising means for obtaining, from wave-A, two derived A-waves having certain phase-shifts introduced therein, means for obtaining, from wave-B, two derived B-waves having certain phase-shifts introduced therein, the phase-shift introduced in the first derived B-wave being greater than the phase-shift introduced in the first derived A-wave by a certain angle, and the phase-shift introduced in the second derived B-wave being less than the phase-shift introduced in the second derived A-wave by a certain angle, said certain angles, being substantially different from zero or any multiple of 180°, means for vectorially combining the first derived A-wave and the first derived B-wave to produce a first resultant-wave, means for vectorially combining the second derived A-wave and the second derived B-wave to produce a second resultant-wave, means for comparing the relative magnitudes of the two resultant waves, and automatic antenna-aiming means for correcting the antenna-aim in one direction or the other, according as the ratio of the magnitudes of the two resultant-waves increases or decreases above or below a value corresponding to on-target conditions.

5. A phase-comparator for responding to the relative phase-angle between two input-waves A and B, said phase-comparator comprising means for obtaining, from wave-A, two derived A-waves having certain phase-shifts introduced therein, means for obtaining, from wave-B, two derived B-waves having a certain phase-shifts introduced therein, the phase-shift introduced in the first derived B-wave being greater than the phase-shift introduced in the first derived A-wave by a certain angle, and the phase-shift introduced in the second derived B-wave being less than the phase-shift introduced in the second derived A-wave by a certain angle, said certain angles approximating an optimum value equal to an odd number of 90°, means for vectorially combining the first derived A-wave and the first derived B-wave to produce a first resultant-wave, means for vectorially combining the second derived A-wave and the second derived B-wave to produce a second resultant-wave, and means for comparing the relative magnitudes of the two resultant-waves.

6. A target-tracking echo-wave device, comprising a transmitter-system, a directional antenna-system for aiming a transmitted wave from said transmitter-system to a target and for receiving an echo-wave from said target, at least the receiving part of said directional antenna-system including two spaced, substantially parallel-aimed antenna-means for in effect receiving two echo-waves from said target, a main wave-conducting means having two spaced detector-means and two intermediate tapped points between said detector-means, two input-circuit wave-conducting means for feeding wave-energy into the two tapped points, from the two antenna-means, respectively, in such manner that the input wave-energy which comes into the main wave-conducting means at each of said tapped points divides and travels as two waves to the respective detector-means, means for taking off a resultant-wave from each of said detector-means, means for separately responding to, and rectifying, the two resultant-waves, and comparing the same with each other in such a way as to obtain, in effect, a unidirectional control-voltage which varies in sign and magnitude in accordance with which one of the two resultant waves is the stronger, and automatic antenna-aiming means, responsive to said control-voltage, for so controlling said antenna-system as to track the target in the plane of said two spaced antenna-means.

7. An echo-wave device, comprising a transmitter-system, a directional antenna-system for aiming a transmitted wave from said transmitter-system to a target and for receiving an echo-wave from said target, at least the receiving part of said directional antenna-system including two spaced, substantially parallel-aimed antenna-means for in effect receiving two echo-waves from said target, a main wave-conducting means having two spaced detector-means and two intermediate tapped points between said detector-means, two input-circuit wave-conducting means for feeding wave-energy into the two tapped points, from the two antenna-means, respectively, in such manner that the input wave-energy which comes into the main wave-conducting means at each of said tapped points divides and travels as two waves to the respective detector-means, means for taking off a resultant-wave from each of said detector-means, and means for separately responding to, and rectifying, the two resultant-waves, and comparing the same with each other in such a way as to obtain, in effect, a unidirectional control-voltage which varies in sign and magnitude in accordance with which one of the two resultant-waves is the stronger.

8. A target-tracking wave-device, comprising a directional antenna-system including two spaced, substantially parallel-aimed antenna means for in effect receiving two waves of the same frequency from said target, a main wave-conducting means having two spaced detector-means and two intermediate tapped points between said detector-means, two input-circuit wave-conducting means for feeding wave-energy into the two tapped points, from the two antenna-means, respectively, in such manner that the input wave-energy which comes into the main wave-conducting means at each of said tapped points divides and travels as two waves to the respective detector-means, means for taking off a resultant-wave from each of said detector-means, means for separately responding to, and rectifying, the two resultant-waves, and comparing the same with each other in such a way as to obtain, in effect, a unidirectional control-voltage which varies in sign and magnitude in accordance with which one of the two resultant waves is the stronger, and automatic antenna-aiming means, responsive to said control-voltage, for so controlling said antenna-system as to track the target in the plane of said two spaced antenna-means.

9. A wave-device, comprising a directional antenna-system including two spaced, substantially parallel-aimed antenna-means for in effect receiving two waves of the same frequency, a main wave-conducting means having two spaced detector-means and two intermediate tapped points between said detector-means, two input-circuit wave-conducting means for feeding wave-energy into the two tapped points, from the two antenna-means, respectively, in such manner that the input wave-energy which comes into the main wave-conducting means at each of said tapped points divides and travels as two waves to the respective detector-means, means for taking off a resultant-wave from each of said detector-means, and means for separately responding to, and rectifying, the two resultant-waves, and comparing the same with each other in such a way as to obtain, in effect, a unidirectional control-voltage which varies in sign and magnitude in accordance with which one of the two resultant waves is the stronger.

10. A wave-device, comprising a directional antenna-system including two spaced, substantially parallel-aimed antenna-means for in effect receiving two waves of the same frequency, a main wave-conducting means having two spaced detector-means and two intermediate tapped points between said detector-means, two input-circuit wave-conducting means for feeding wave-energy into the two tapped points, from the two antenna-means, respectively, in such manner that the input wave-energy which comes into the main wave-conducting means at each of said tapped points divides and travels as two waves to the respective detector-means, and means for taking off a resultant-wave from each of said detector-means.

11. The wave-device as defined in claim 2 with the two input-circuit wave-conducting means consisting of wave guides of equal length.

References Cited in the file of this patent

UNITED STATES PATENTS

| | | |
|---|---|---|
| 2,012,480 | Reich | Aug. 27, 1935 |
| 2,166,991 | Guanella | July 25, 1939 |
| 2,305,614 | Goldstein | Dec. 22, 1942 |
| 2,408,414 | Donaldson | Oct. 1, 1946 |
| 2,411,876 | Hansen | Dec. 3, 1946 |
| 2,411,916 | Woodyard | Dec. 3, 1946 |
| 2,416,155 | Chubb | Feb. 18, 1947 |
| 2,423,390 | Korman | July 1, 1947 |
| 2,425,009 | Shepherd | Aug. 5, 1947 |
| 2,427,029 | Stearns | Sept. 9, 1947 |
| 2,433,991 | Hebb | Jan. 6, 1948 |
| 2,445,213 | Evans | July 13, 1948 |
| 2,456,666 | Agate et al. | Dec. 21, 1948 |
| 2,467,361 | Blewett | Apr. 12, 1949 |
| 2,473,175 | Ridenour | June 14, 1949 |
| 2,480,829 | Barrow | Sept. 6, 1949 |
| 2,510,692 | Goddard | June 6, 1950 |
| 2,523,398 | Southworth | Sept. 26, 1950 |
| 2,562,281 | Mumford | July 31, 1951 |
| 2,566,020 | Fenn | Aug. 28, 1951 |

FOREIGN PATENTS

| | | |
|---|---|---|
| 610,664 | Great Britain | Oct. 19, 1948 |